(12) United States Patent
Luk-Pat et al.

(10) Patent No.: US 7,483,559 B2
(45) Date of Patent: Jan. 27, 2009

(54) METHOD AND APPARATUS FOR DEBLURRING MASK IMAGES

(75) Inventors: Gerard Terrence Luk-Pat, Sunnyvale, CA (US); Fang-Cheng Chang, Los Altos, CA (US)

(73) Assignee: Synopsys, Inc., Mountain View, CA (US)

(*) Notice: Subject to any disclaimer, the term of this patent is extended or adjusted under 35 U.S.C. 154(b) by 908 days.

(21) Appl. No.: 10/917,942

(22) Filed: Aug. 13, 2004
(Under 37 CFR 1.47)

(65) Prior Publication Data
US 2006/0034505 A1    Feb. 16, 2006

(51) Int. Cl.
*G06K 9/00* (2006.01)
(52) U.S. Cl. ............... 382/144; 382/100; 382/141; 382/145; 382/254; 382/255
(58) Field of Classification Search ........... 382/100, 382/144–151, 141, 255, 181, 209, 254, 296, 382/300, 299, 278
See application file for complete search history.

(56) References Cited
U.S. PATENT DOCUMENTS
6,563,324 B1 *  5/2003  Nichani ............... 324/537

| | | | |
|---|---|---|---|
| 6,658,145 B1 * | 12/2003 | Silver et al. | 382/149 |
| 6,763,142 B2 * | 7/2004 | Dai et al. | 382/260 |
| 6,865,288 B1 * | 3/2005 | Shishido et al. | 382/145 |
| 7,016,539 B1 * | 3/2006 | Silver et al. | 382/216 |
| 7,224,823 B2 * | 5/2007 | Hayata et al. | 382/118 |

OTHER PUBLICATIONS

A. K. Jain, "Fundamentals of Digital Image Processing," Prentice Hall, Englewood Cliffs, New Jersey, 1989, ISBN 0 13-336165-9 (the Jain text). In particular, Chapter 8 of this text (pp. 267-341) discusses "Image Filtering and Restoration."

* cited by examiner

*Primary Examiner*—Samir A Ahmed
*Assistant Examiner*—Eric Rush
(74) *Attorney, Agent, or Firm*—Park, Vaughan & Fleming LLP

(57) ABSTRACT

The invention comprises processes for determining and applying a deblurring filter that reduces inspection system distortion, of mask inspection images, by compensating for the non-uniform frequency response of the inspection system.

In particular, an adaptive filter is determined empirically for an inspection system: one or more training images are obtained by the inspection system and the filter is determined from such images. In this way, the filter can adapt to the characteristics of each individual inspection system.

An example adaptive filter, known as a Weiner filter, is determined and applied.

25 Claims, 17 Drawing Sheets

EXAMPLE INSPECTION SYSTEM PROCESS

EXAMPLE INSPECTION SYSTEM PROCESS WITH DEBLURRING

FIND COMBINED W OF
ALL TRAINING IMAGES

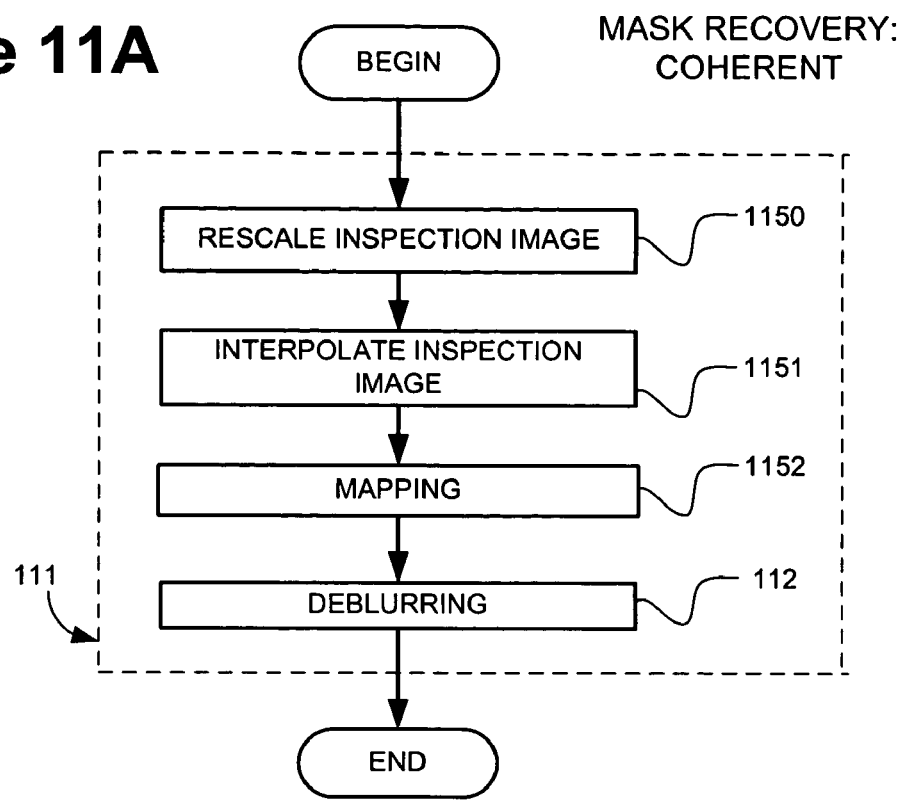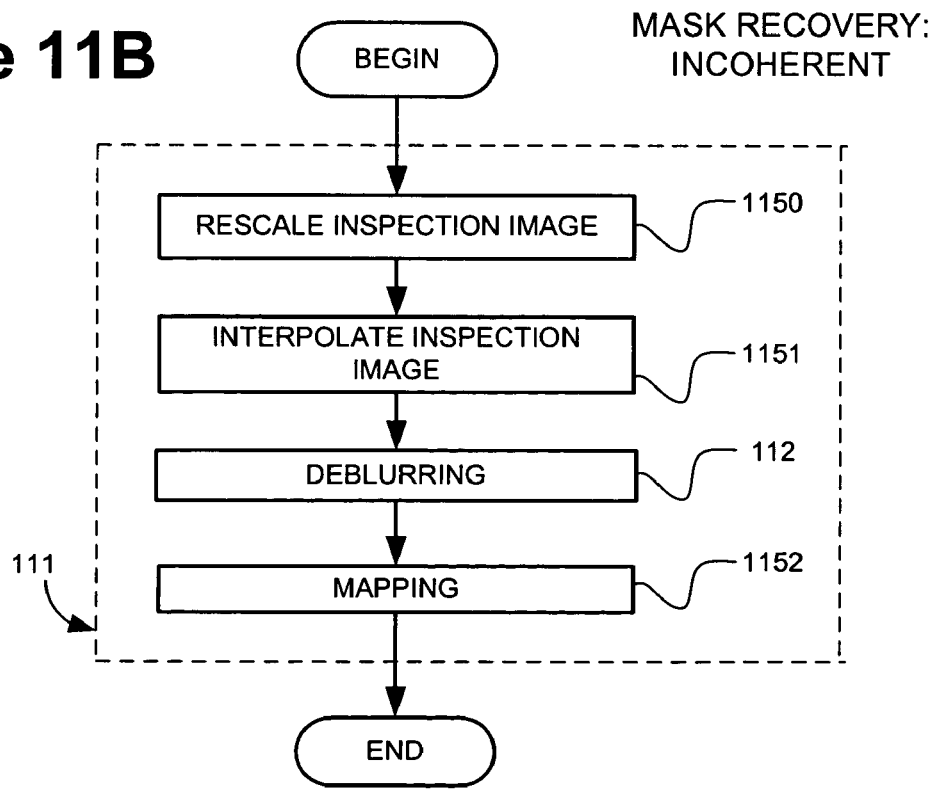

METHOD AND APPARATUS FOR DEBLURRING MASK IMAGES

FIELD OF THE INVENTION

The present invention relates generally to filters for improving the resolution of mask images, and more particularly to using such filters to improve the ability to detect mask errors.

BACKGROUND OF THE INVENTION

As part of a process of manufacturing integrated circuits (ICs), inspection systems can be applied to search for mask defects. An example inspection system process is shown in FIG. 5A.

The process of FIG. 5A begins with a photolithography mask (500) to be searched for defects. An inspection system is applied to the mask to obtain an inspection image (step 501). The inspection image is input to a "mask recovery" step (step 502) that produces an estimate of the mask. This mask estimate is then input to a photolithography simulator (step 503, that can also be referred to as a "stepper simulator") that produces a simulated wafer image (504).

A computer program can compare this simulated wafer image with a reference wafer image, searching for differences representing defects that could result during the mask manufacturing process. Each such defect found can be given a score representing its level of significance.

The inspection system can be an optical system that has a limited frequency response. For example, an inspection system can cause the spectral characteristic, of the received inspection image, to suffer greater attenuation as frequency increases. This attenuation at higher frequencies tends to cause a loss of resolution in the inspection image, increasing the size of the smallest defects that can be detected.

It would therefore be desirable to have a filter that could be applied to the inspection image, before such image is input to a photolithography simulator, to reduce frequency distortion introduced by the inspection system.

SUMMARY OF THE INVENTION

Summary of the Overview

The invention comprises processes for determining and applying a deblurring filter that reduces inspection system distortion by compensating for the non-uniform frequency response of the inspection system.

In particular, an adaptive filter is determined empirically for an inspection system: one or more training images are obtained by the inspection system and the filter is determined from such images. In this way, the filter can adapt to the characteristics of each individual inspection system.

In general, an adaptive filter is derived by optimizing a suitable metric. An example adaptive filter, known as a Weiner filter, is determined and applied. A Weiner filter, when applied to an inspection image, minimizes the (sum of the) squared error between the filtered and "ideal" versions of that inspection image. The ideal image can be approximated, for training purposes, by thresholding the inspection image.

While the discussion below focuses on determination of a two dimensional Weiner filter, in general, an adaptive filter, suitable for mask image deblurring, can be one dimensional or two dimensional, and can optimize other metrics.

An overall process for the present invention can be divided into two parts: filter training and image deblurring.

Filter training can comprise a loop where multiple training images are processed.

Once a set of filter weights, W, has been found, the part of the overall process referred to as "image deblurring" can begin by obtaining an inspection image of a mask to be deblurred. The mask inspection image is input to a mask recovery step that produces an estimate of the mask. As part of mask recovery, deblurring is performed in which the inspection image is convolved with W.

The process of finding a W can be divided into four steps. First, the training image is interpolated to a higher resolution grid format. Next, the training image is thresholded to provide an "ideal image" for training the filter. Third, a one dimensional filter is determined from the thresholded and un-thresholded versions of the training image by optimizing a suitable metric. If a two dimensional filter is desired, the one dimensional filter can be converted into a two dimensional filter. If a two dimensional filter is produced, the matrix of two dimensional weights, comprising $W_{2D}$, can then be normalized such that it has unity gain. If a one dimensional filter is produced, the vector of one dimensional weights, comprising $W_{1D}$, can then be normalized such that it has unity gain.

The process of determining a one dimensional Weiner filter can be divided into the following four steps. First, the auto-correlation matrix, R, that compares the training image to itself, is found. Second, a cross-correlation vector, P, that compares the training image to its thresholded version, is determined. Third, a one dimensional filter, $W_{1D}$, is found by multiplying the inverse of R with P. Fourth, $W_{1D}$ is made even-symmetric by averaging it with its reflection about its midpoint.

The process of converting a one dimensional filter into a two dimensional filter can be divided into the following steps.

Low pass filtering of the one dimensional $W_{1D}$ can be performed.

At this point in the process, it can be appropriate to apply the fast Fourier transform (FFT) to convert the one dimensional $W_{1D}$ into the frequency domain.

Before $W_{1D}$ is rotated onto a two dimensional grid, the radial frequency distances are found at which such grid would sample the two dimensional W.

Interpolation can then be performed, among the appropriate points of $W_{1D}$, to determine a value for W at each radial frequency distance in the two dimensional grid.

The relevant interpolated values are assembled into a two dimensional grid. The effect of this assembly is to rotate $W_{1D}$ by 360 degrees, resulting in a circularly symmetric two dimensional W.

An inverse FFT is performed on the two dimensional W, to convert it back into filter weights for application to an image. As such, W is now a two dimensional matrix of weights. In performing the inverse FFT, only the real part is typically kept.

Summary of Further Details

The training images can be two dimensional images that vary in only one dimension.

An advantage of a training image, compared with an arbitrary image, is that a simple thresholding of the training image can provide an estimate of the true location of the training image's edges. The thresholded training image can also be referred to as an "ideal" (or the desired) version of the training image since it may be the best estimate available of the true location of the training image's edges.

It can be desirable to interpolate a training image, to a higher resolution, prior to it being thresholded. Such interpolation can improve the accuracy with which thresholding finds the actual edges of a training image.

Truncation of the $W_{1D}$ spectrum at its high-frequency edge should be avoided. Otherwise, circular symmetry of the two dimensional filter obtained from $W_{1D}$ may be compromised by spatial quantization effects. Before $W_{1D}$ is rotated to produce a two dimensional filter, it can be desirable to low pass filter such that the spectrum of $W_{1D}$ gradually decreases to a negligible value at its high-frequency edge.

The low-pass filtered version of $W_{1D}$, can be referred to as $W_{1D,LPF}$.

A two dimensional filter W can be created by rotating $W_{1D,LPF}$.

In particular, the two dimensional spectrum of W, as a result of such rotation, is sampled with a two dimensional Cartesian grid.

The set of radial frequency distances at all points in this Cartesian grid can be referred to as $f_{r,2D}$. Then the spectrum of $W_{1D,LPF}$ which can now be regarded as a function of radial frequency distance, can be interpolated to obtain values of W at $f_{r,2D}$.

In general, for each point in $f_{r,2D}$, there is a rotation of $W_{1D,LPF}$ that indicates where one-dimensional interpolation can be performed.

As described above, W can be applied within a mask-recovery process. The particular point in the mask recovery process, however, at which deblurring is applied, can depend upon the type of inspection system (e.g., coherent or incoherent).

In general, mask-recovery seeks to obtain the "mask field" for each location of a mask's inspection image.

Depending upon the characteristics of the inspection system, separable filter training can be preferable. A two-dimensional filter, W, can be described as "separable" if it can be written as the following product:

$$W(x,y)=W_x(x)W_y(y)$$

where $W_x$ is a function of "x" only and $W_y$ is a function of "y" only, and where "x" and "y" are orthogonal axes.

For separable filter training, some training images can vary along a horizontal axis while other training images can vary along a vertical axis. Further modifications of the filter training process, to achieve separable filter training, are presented.

Certain aspects of mask recovery, described above with respect to application of a deblurring filter, can also be applied to the training images. The applicability of these mask recovery steps to training images can depend upon the type of inspection system (e.g., coherent or incoherent).

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 7A, 7B and 7C depict low pass filtering of an example one dimensional filter, $W_{1D}$, in the frequency domain, while

FIG. 11A depicts an example mask recovery process for a coherent inspection system, FIG. 11B depicts an example mask recovery process for an incoherent inspection system and FIG. 11C depicts an example mapping process for use in mask recovery.

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

| Table of Contents to Detailed Description |
|---|
| 1. Overview |
| 2. Further Details |
|     2.1 Interpolation |
|     2.2 Training Images |
|     2.3 One Dimensional Filter Determination |
|     2.4 One To Two Dimension Filter Conversion |
|     2.5 Image Deblurring |
|     2.6 Modified Approach: Separable Filter Training |
|     2.7 Training Image Recovery |
| 3. HARDWARE ENVIRONMENT |

1. Overview

Deblurring, generally, is discussed in such texts as: A. K. Jain, "Fundamentals of Digital Image Processing," Prentice Hall, Englewood Cliffs, N.J., 1989, ISBN 0-13-336165-9 (the Jain text). In particular, Chapter 8 of this text (pp.267-341) discusses "Image Filtering and Restoration." The Jain text is herein incorporated by reference in its entirety.

Figure 5A:
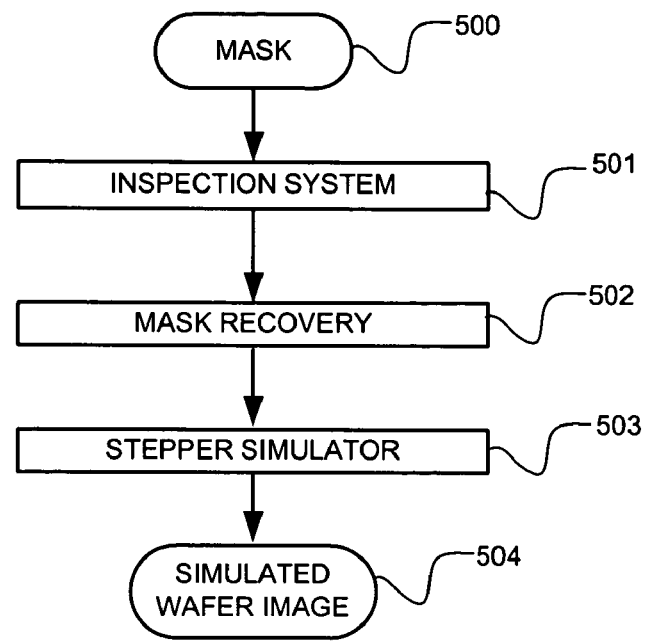
FIGS. 5A, 5B depict example inspection system processes.
Figure 5B:
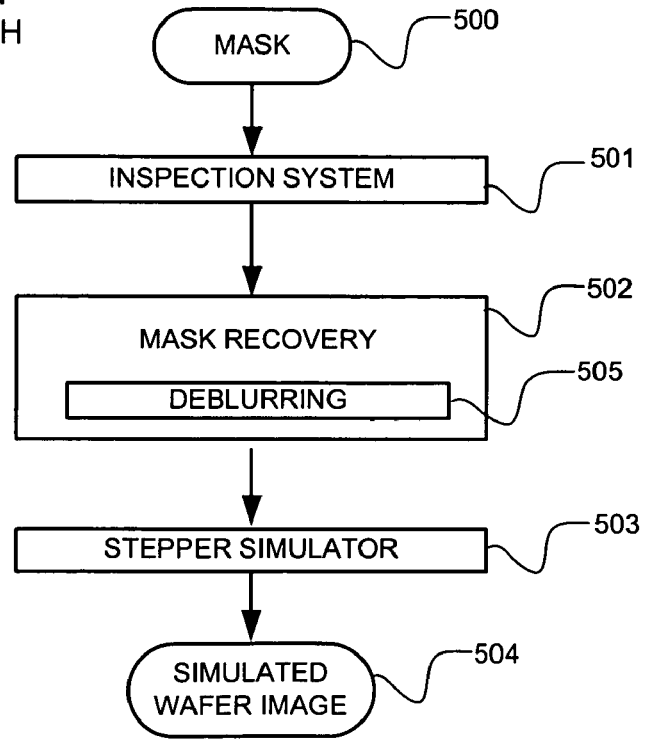

The invention comprises processes for determining and applying a deblurring filter that reduces inspection system distortion by compensating for the non-uniform frequency response of the inspection system. Such filtering is represented in FIG. 5B as an addition of deblurring step 505 to the "mask recovery" step 502.

In particular, an adaptive filter is determined empirically for an inspection system: one or more training images are obtained by the inspection system and the filter is determined from such images. In this way, the filter can adapt to the characteristics of each individual inspection system.

In general, an adaptive filter is derived by optimizing a suitable metric. An example adaptive filter, known as a Weiner filter, is determined and applied. A Weiner filter, when applied to an inspection image, minimizes the (sum of the) squared error between the filtered and "ideal" versions of that inspection image. The ideal image can be approximated, for training purposes, by thresholding the inspection image.

While the discussion below focuses on determination of a two dimensional Weiner filter, in general, an adaptive filter, suitable for mask image deblurring, can be one dimensional or two dimensional, and can optimize other metrics. Examples of other such metrics include minimizing the maximum error, or minimizing the absolute value of the error.

Figure 1:
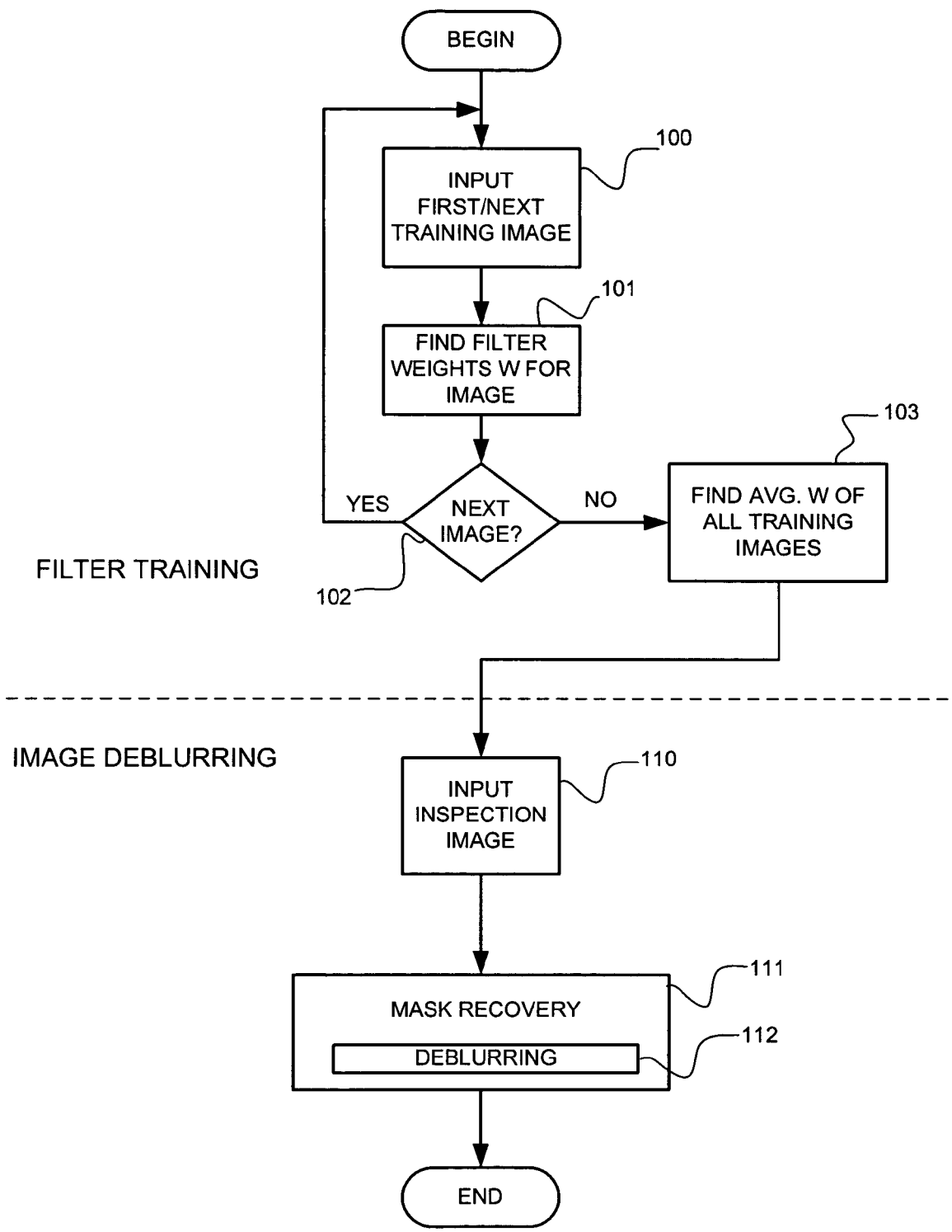
FIG. 1 depicts an overall process for the present invention.

An overall process for the present invention is depicted in FIG. 1. The process of FIG. 1 is divided into two parts: filter training (steps 100 to 103) and image deblurring (steps 110 to 112).

As can be seen, the filter training procedure can comprise a loop (steps 100 to 102) where multiple training images are processed. For each training image, a set of filter weights, W, is determined (step 101). Once all the training images have been processed, an average W is determined (step 103).

After a set of filter weights, W, has been found, the part of the overall process referred to as "image deblurring" can begin by obtaining an inspection image of a mask to be deblurred (step 110). The mask inspection image is input to a mask recovery step (step 111) that produces an estimate of the mask. As part of mask recovery 111, a deblurring step 112 can be performed in which the inspection image is convolved with W.

Figure 2:
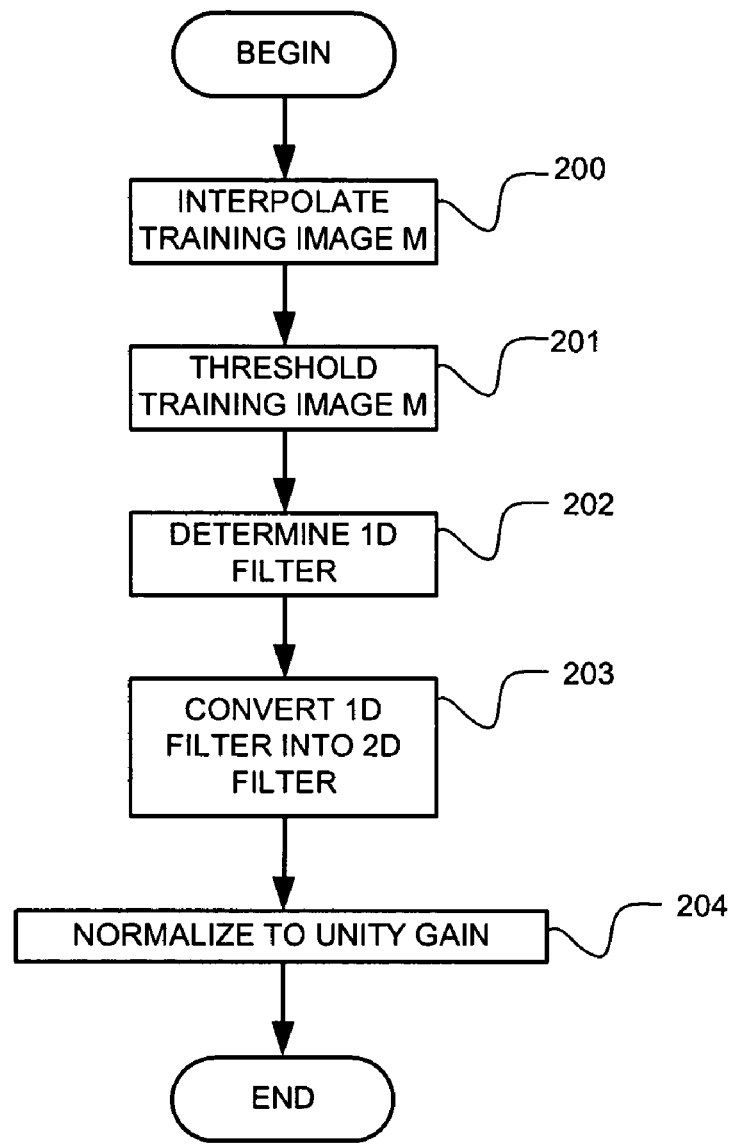
FIG. 2 depicts an expansion of step 101 of FIG. 1 where a filter, W, is found for each training image.

An expansion of step 101 of FIG. 1, where a W is found for each training image, is depicted by the flowchart of FIG. 2.

Figure 3:
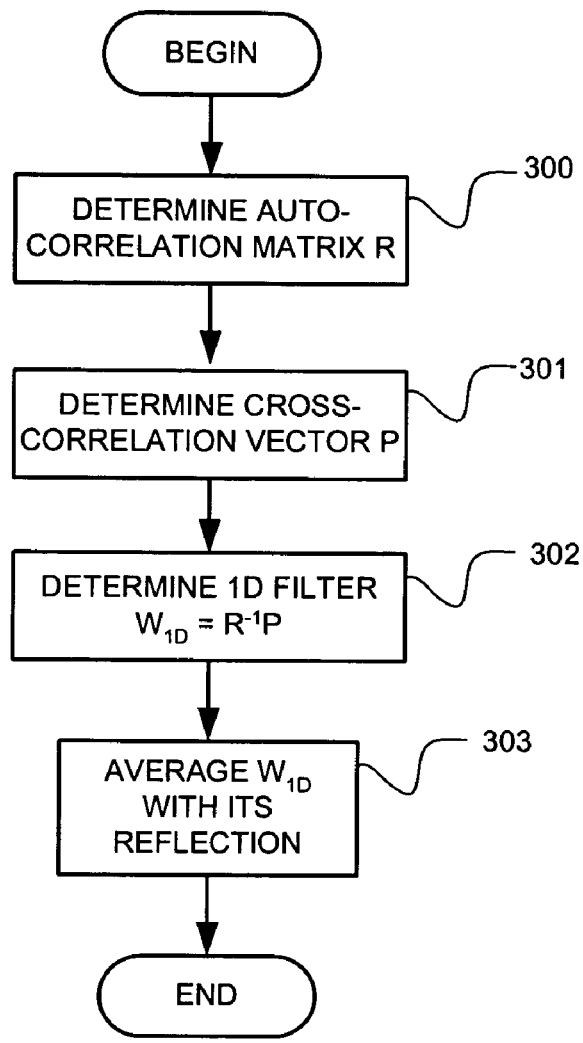
FIG. 3 depicts an expansion of step 202 of FIG. 2 where a one dimensional filter is determined from the training image.
Figure 4:
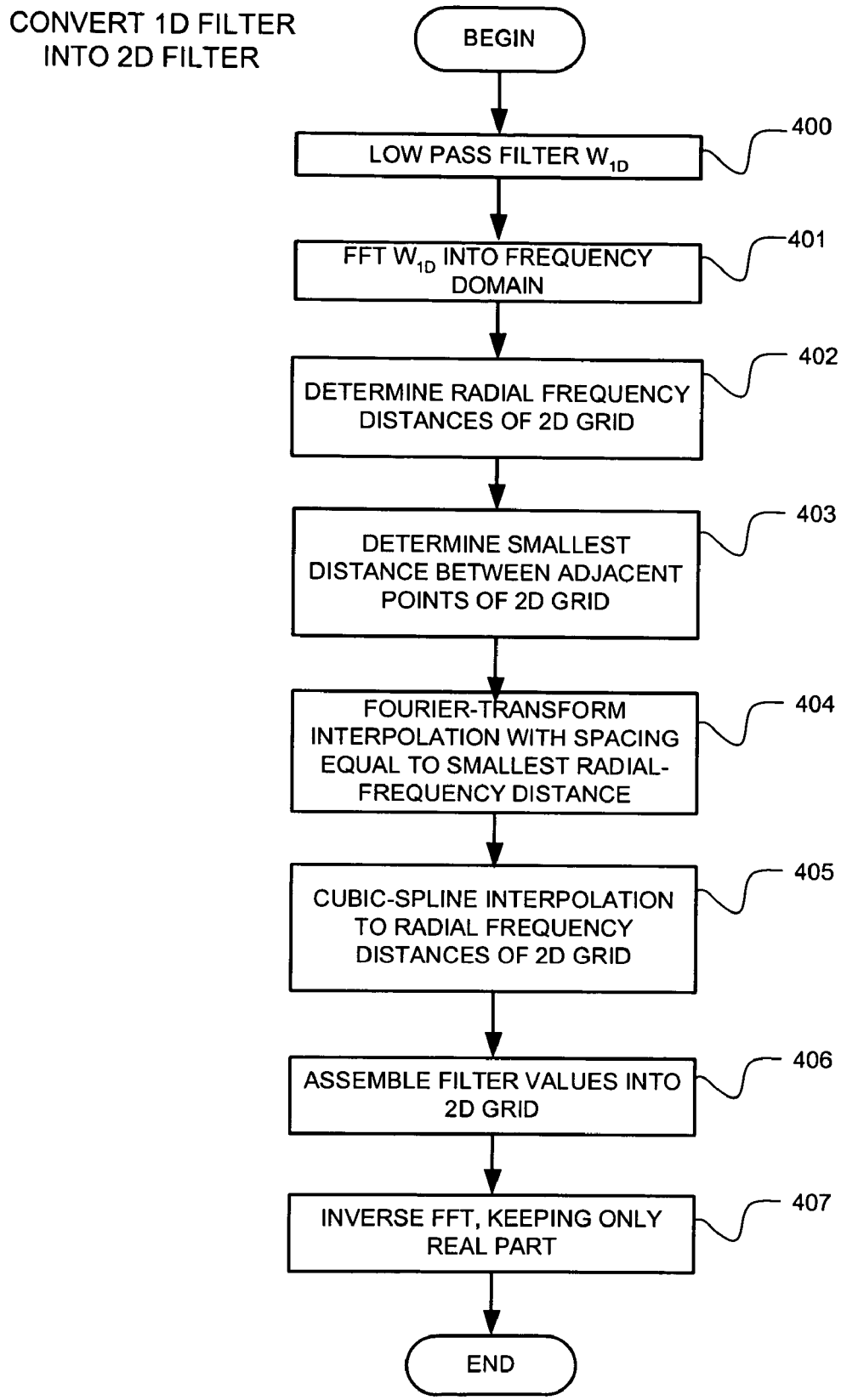
FIG. 4 depicts an expansion of step 203 of FIG. 2 where a one dimensional filter is converted into a two dimensional filter.

In accordance with FIG. 2, the process of finding a W can be divided into four steps. First, the training image is interpolated to a higher resolution grid format (step 200). Next, the training image is thresholded (step 201) to provide an "ideal image" for training the filter. Third, a one dimensional filter is determined from the thresholded and un-thresholded versions of the training image (step 202) by optimizing a suitable metric. Examples of such metrics include minimizing the squared error, minimizing the maximum error or minimizing the absolute value of the error. An example expansion of step 202, for minimizing the squared error, is depicted by the flowchart of FIG. 3. If a two dimensional filter is desired, the one dimensional filter can be converted into a two dimensional filter (step 203). An expansion of step 203 is depicted by the flowchart of FIG. 4. If a two dimensional filter is produced, the matrix of two dimensional weights, comprising $W_{2D}$, can then be normalized such that it has unity gain (step 204). If a one dimensional filter is produced, the vector of one dimensional weights, comprising $W_{1D}$, can then be normalized such that it has unity gain (step 204). Unity gain means the sum of the filter weights is one.

In accordance with FIG. 3, the process of determining a one dimensional Weiner filter can be divided into the following four steps. First, the auto-correlation matrix, R, that compares the training image to itself, is found (step 300). Second, a cross-correlation vector, P, that compares the training image to its thresholded version, is determined (step 301). Third, a one dimensional filter, $W_{1D}$, is found by multiplying the inverse of R with P (step 302). Fourth, $W_{1D}$ is made even-symmetric by averaging it with its reflection about its midpoint (step 303). In general, a function, $f(x)$, is even-symmetric about a point $x_0$ if $f(x_0+x)=f(x_0-x)$ for any x.

In accordance with FIG. 4, the process of converting a one dimensional filter into a two dimensional filter can be divided into the following steps.

Low pass filtering of the one dimensional $W_{1D}$ can be performed (step 400).

At this point in the process, it can be appropriate to apply the fast Fourier transform (FFT) to convert the one dimensional $W_{1D}$ into the frequency domain (step 401). Use of only the positive frequencies, thus determined by the FFT, is discussed below.

Before $W_{1D}$ is rotated onto a two dimensional grid, the radial frequency distances are found at which such grid would sample the two dimensional W (step 402).

Next, the smallest distance, Δf, between any two such radial frequency distances, is determined (step 403).

Any interpolation method can be performed on $W_{1D}$ such that it has values at a regular spacing of size Δf (step 404).

Any interpolation method, that can produce non-uniformly spaced samples, can then be performed, among the appropriate points of $W_{1D}$, to determine a value for W at each radial frequency distance in the two dimensional grid (step 405).

The relevant interpolated values are assembled into a two dimensional grid. The effect of this assembly is to rotate $W_{1D}$ by 360 degrees, resulting in a circularly symmetric two dimensional W (step 406).

An inverse FFT is performed on the two dimensional W, to convert it back into filter weights for application to an image. As such, W is now a two dimensional matrix of weights (step 407). In performing the inverse FFT, only the real part is typically kept.

2. Further Details 2.1 Interpolation

Interpolation can be of two types: linear, spatially-variant or linear, spatially-invariant. An example of linear, spatially-variant (or simply spatially-variant) interpolation is cubic-spline interpolation. An example of linear, spatially-invariant (or simply spatially-invariant) interpolation is Fourier interpolation.

Interpolation can be applied to produce two types of sample spacing: uniform or non-uniform. Generally, spatially-variant interpolation is preferred for producing non-uniform sample spacings and spatially-invariant interpolation is preferred for producing uniform sample spacings. Possible exceptions to this general preference, however, are noted below.

2.2 Training Images

The training images can be two dimensional images that vary in only one dimension. For example, if a training image varies only in the horizontal direction, then it can consist of a series of vertically-oriented stripes, alternating between black and white. The horizontal width and spacing of such stripes can be fixed for a given inspection image, but several inspection images can be used for training, each with a different horizontal width and spacing.

An ideal inspection image consists only of two values: black and white. However, inspection images typically contain grayscale information that represents blurring by the inspection system. Such grayscale information is typically located near the transitions between different image regions, obscuring the exact locations of the transitions, or edges, between those regions.

Figure 8A:
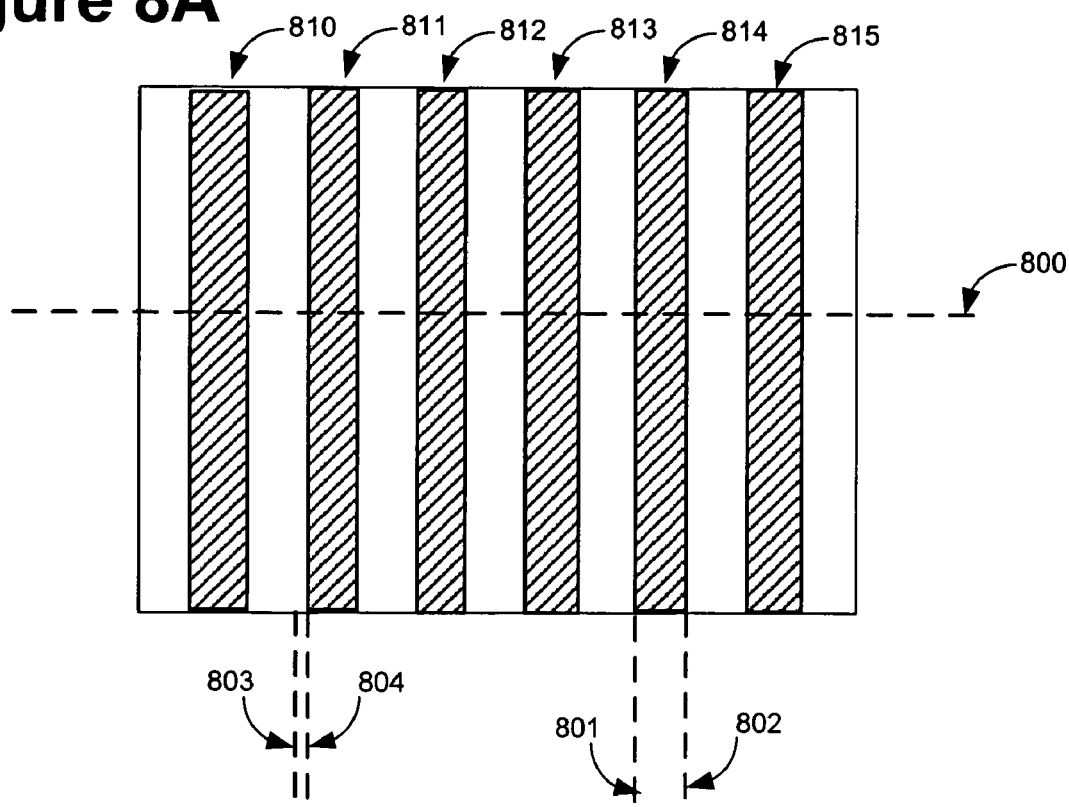
FIGS. 8A, 8B depict an example training image.

A simplified example inspection image, that could be used for training, is shown in FIG. 8A. In order to represent the inspection image of FIG. 8A as a simple line drawing, those areas of the example training image that would generally appear as primarily "dark" are represented as cross-hatched regions 810 to 815. When traversing the image represented by FIG. 8A, however, along any horizontal line, there is, in fact, a continuum of intensity values. An example horizontal line 800 is shown in FIG. 8A. An example continuum for line 800 is shown in FIG. 8B.

Figure 8B:
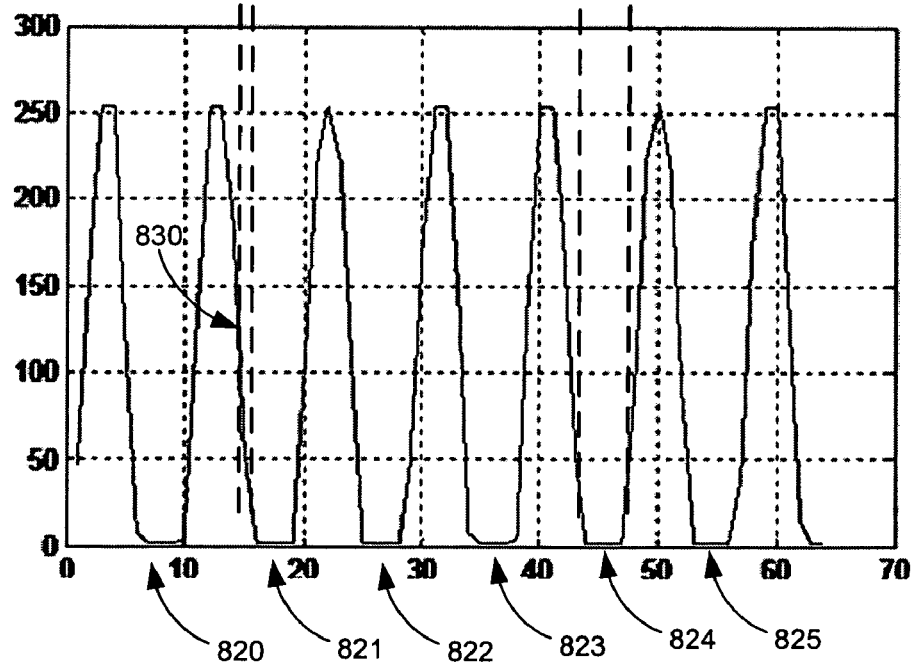

FIG. 8A is aligned with FIG. 8B such that dark regions 810 to 815 of FIG. 8A correspond to troughs 820 to 825 of FIG. 8B. For dark region 814, for example, dashed lines 801 and 802 have been added to show how the horizontal extent of region 814 corresponds to the horizontal extent of trough 824.

An advantage of a training image, compared with an arbitrary image, is that a simple thresholding of the training image can provide an estimate of the true location of the training image's edges. In particular, a training image can allow a single threshold to be applied instead of a spatially variant threshold. The thresholded training image can also be referred to as an "ideal" (or the desired) version of the training image since it may be the best estimate available of the true location of the training image's edges.

It can be desirable to interpolate a training image, to a higher resolution, prior to it being thresholded. Such interpolation can improve the accuracy with which thresholding finds the actual edges of a training image. Despite the general preference for linear, spatially-invariant interpolation, when producing samples of a fixed spacing, the preferred interpolation method can be a linear, spatially-variant method since linear spatially-invariant interpolation can be more likely to produce spectral nulls in the resulting filter. The interpolation decreases the image pixel size by a factor that shall be referred to as q. A suitable value for q can be 4.

As discussed above, an ideal version of a training image, suitable for determining (or training) a filter, can be found by thresholding the training image. A suitable threshold, for a particular training image, can be determined by finding the pixel with the maximum intensity and the pixel with the minimum intensity. A suitable threshold can be the arithmetic mean of these two pixel intensity values.

For the example continuum of FIG. 8B, if the maximum intensity value is approximately 250, and the minimum intensity value is approximately 0, then an arithmetic mean threshold is at the intensity value 125. An example location of an edge, for an ideal training image corresponding to the gradient of FIG. 8B, is indicated in FIG. 8B by point 830. While the left edge of dark region 811 may appear visually to be located at line 804, based upon the above-described arithmetic mean threshold selection, the location of the corresponding edge in the ideal training image is indicated by line 803.

Herein, "ideal" (or desired) as applied to an image, shall be understood to refer to a version of an image that provides an approximation of the location of the actual edges of the image. Such approximation can be accomplished by any suitable method, including thresholding.

2.3 One Dimensional Filter Determination

A one dimensional Weiner filter can be determined for a training image by finding a filter, $W_{1D}$, that, when applied to the training image, minimizes the squared error between the filtered and ideal versions of that training image. A suitable number of taps for $W_{1D}$ can be 10. This filter determination can be accomplished by the following steps. While the following steps of this section are for optimization according to the metric of minimizing the squared error, a one dimensional adaptive filter can be determined by optimization of any suitable metric. An example of an alternative metric is minimization of the maximum error.

An auto-correlation matrix, R, that describes how the training image is correlated with itself, can be found by the following formula:

$$R = \frac{\sum_{i,j} m(i,j) m^T(i,j)}{\sum_{i,j} 1}$$

where $m(i, j)$ is a vector extracted from a training image represented as a matrix $M(i, j)$, i indexing by column and j indexing by row. Vector $m(i, j)$ can be defined by the following formula:

$$m(i,j) = [M(i,j) M(i+1,j) M(i+2,j) \ldots M(i+(N-1),j)]^T$$

where N is the number of taps in the desired one dimensional $W_{1D}$, and the superscript, T, means matrix transposition. Since vector $m^T(i, j)$ is the transpose of the column represented by $m(i, j)$, it is a row. Therefore, the multiplication of $m(i, j)$ by $m^T(i, j)$, shown as $m(i, j) m^T(i, j)$ in the above formula, is an N X N matrix.

The subscript, i, j of the above summation operators, $\Sigma$, (the summation operator is hereafter referred to as "sigma") operates as follows. The subscript, i, j, begins at i=0, j=0, and increments by i first and then by j after each row j has been exhausted. In particular, the i part of i, j increments by one until i+(N−1) accesses the maximum column of $M(i, j)$, at which point i is reset to zero and j increments by one. The j part of i, j increments by one until j accesses the maximum row of $M(i, j)$, at which point the subscript i, j ends. The total number of pairs of i, j pairs, thus generated, is referred to as total_ij.

All total_ij matrices, of size N X N, produced by the i, j subscript of the numerator's sigma in the above formula for R, are matrix-summed together by the numerator's sigma. The single, resulting, N X N matrix of the numerator is then matrix-divided by the scalar value determined by the denominator's sigma. That scalar value is simply total_ij.

A cross-correlation vector, P, between the training image and its ideal image, can be found by the following formula:

$$P = \frac{\sum_{i,j} m(i,j) B\left(i + \left\lceil \frac{N}{2} \right\rceil - 1, j\right)}{\sum_{i,j} 1}$$

where "$\lceil x \rceil$" means smallest integer greater than "x." $B(i, j)$ is the ideal version of training image, $M(i, j)$, also represented as a matrix, indexed by column i and row j.

The subscripts, i, j, of the above sigmas for the formula for P, operate the same as for the above formula for R. The total number of i, j pairs generated is also total_ij.

In the formula for P, however, since the vector $m(i, j)$ is multiplied by the scalar value $B(i, j)$, the result is a column vector of N elements.

All total_ij vectors, of size N, produced by the i, j subscript of the numerator's sigma in the above formula for P, are vector-summed together by the numerator's sigma. The single, resulting, N element vector of the numerator is then vector-divided by the scalar value determined by the denominator's sigma. That scalar value is also total_ij.

A set of one dimensional filter weights, $W_{1D}$, can then be found with the following formula:

$$W_{1D} = R^{-1} P$$

where $R^{-1}$ is the matrix inverse of R. Averaging $W_{1D}$ with its reflection about its midpoint ensures its even symmetry.

Figure 6A:
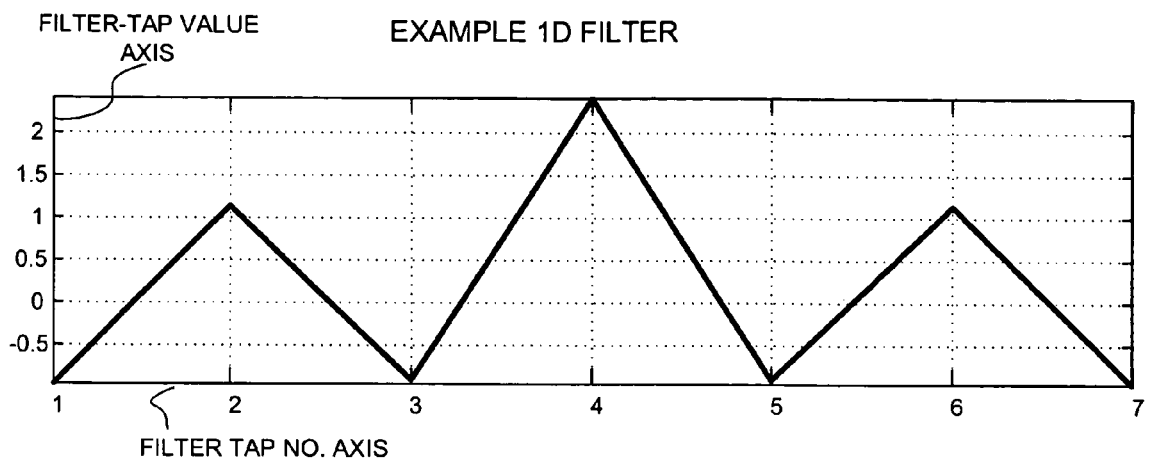
FIGS. 6A, 6B depict an example one dimensional filter, $W_{1D}$, in the image and frequency domains.

An example one dimensional filter, $W_{1D}$, in this case with 7 taps, is shown in FIG. 6A. The selection of a particular vertical scale for FIG. 6A is not relevant until the step of normalization (step 204 of FIG. 2) is done. After normalization, the vertical scale of the filter should match the vertical scale of the inspection images to be deblurred. An example vertical scale for an inspection image can be the percentage of intensity transmitted.

2.4 One to Two Dimension Filter Conversion

This section discusses, in greater detail, the steps of FIG. 4.

Figure 6B:
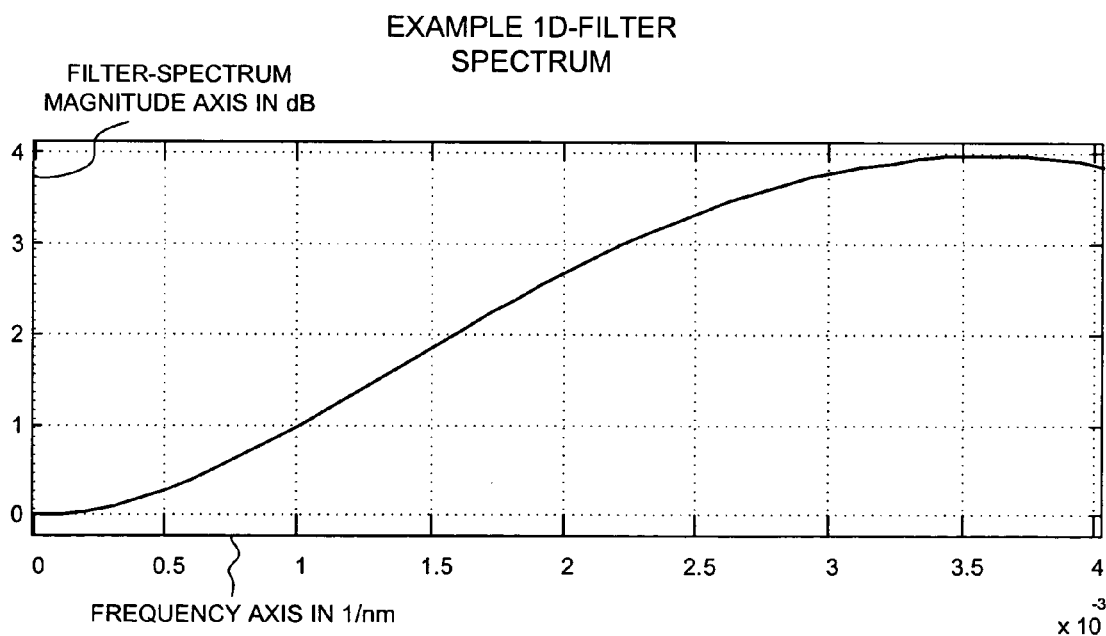
Figure 7A:
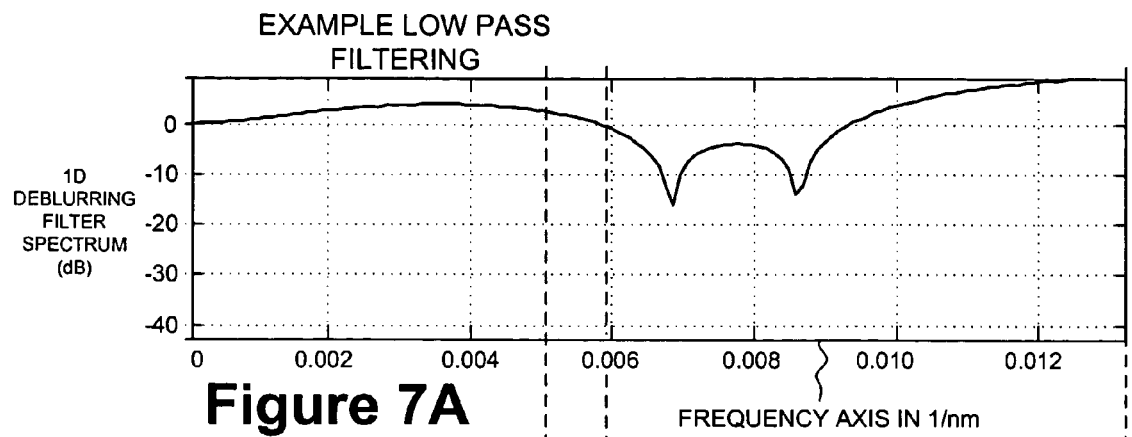

FIG. 7A depicts the result of converting the image domain $W_{1D}$ of FIG. 6A into the frequency domain by means of the fast Fourier transform (FFT). FIG. 7A depicts the magnitude of only the positive frequency values resulting from the FFT, as only those values are discussed herein with regard to further processing. FIG. 6B is a "zoomed-in" version of FIG. 7A (specifically, the portion of FIG. 7A from 0 to 0.004 on the frequency axis) that emphasizes that portion of FIG. 7A corresponding to non-zero spectrum in an inspection-image.

Low pass filtering of $W_{1D}$ is illustrated in FIG. 7 in the frequency domain. While depicted in the frequency domain, low pass filtering can be performed prior to conversion of $W_{1D}$ into the frequency domain, as shown by the position of step 400 in FIG. 4.

Figure 7B:
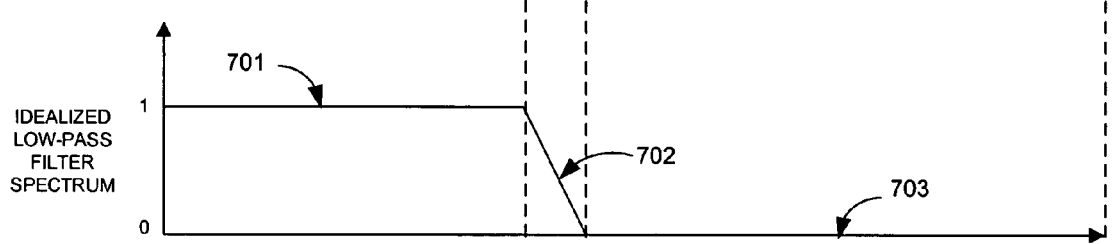
Figure 7C:
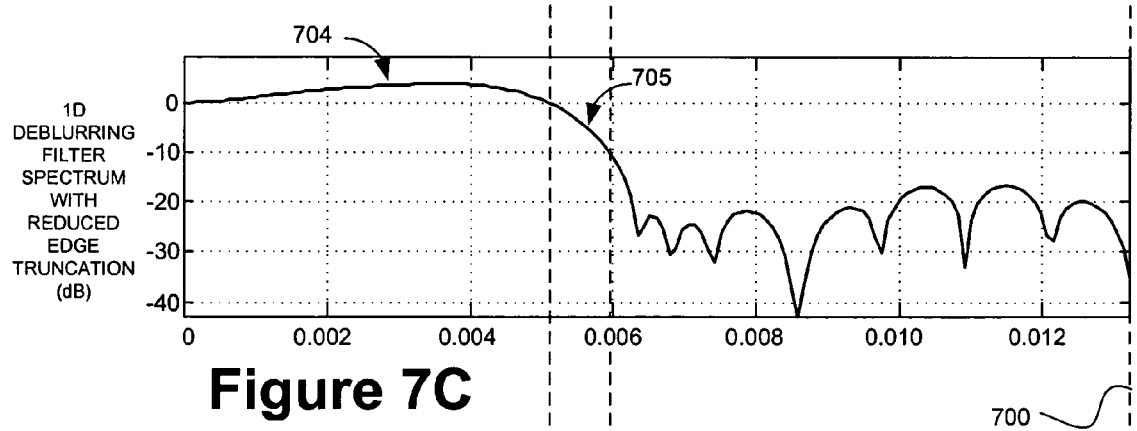

FIG. 7B shows an idealized low pass filter, while FIG. 7C shows the result of applying the low pass filter of FIG. 7B to FIG. 7A. The truncation of the $W_{1D}$ spectrum at its high-frequency edge, shown in FIG. 7A toward the right side of the frequency axis, should be avoided. Otherwise, circular symmetry of the two dimensional filter obtained from $W_{1D}$ may be compromised by spatial quantization effects. The location of edge truncation is indicated in FIGS. 7A, 7B and 7C by line 700 (since the plot of FIG. 7A continues until it reaches line 700). Before $W_{1D}$ is rotated to produce a two dimensional filter, it can be desirable to low pass filter such that the spectrum of $W_{1D}$ gradually decreases to a negligible value at its high-frequency edge.

FIG. 7B depicts an idealized low pass filter whose spectrum consists of a pass band, which has a value of one (region 701); a transition band, which is a downward slope from one to zero (region 702); and a stop band, which has a value of zero (region 703). The center frequency of the transition band, which can be described as the cutoff frequency, $f_{cutoff}$, can be set to the value, $$f_{cutoff} = \frac{1.6}{2d_0}$$

where $d_0$ is the inspection-image pixel size before interpolation. The low pass filter can be a linear-phase finite impulse response filter with 21 taps, designed using least-squares error minimization, for example.

FIG. 7C depicts the low-pass filtered version of $W_{1D}$, which can be referred to as $W_{1D,LPF}$. In the frequency region corresponding to the pass band of the low pass filter, the input $W_{1D}$ spectrum is replicated (see region 704 for example). In the frequency region corresponding to the transition band, the spectrum of $W_{1D,LPF}$ gradually decreases to a negligible value (see region 705 for example).

A two dimensional filter W can be created by rotating $W_{1D,LPF}$. The rotation point can be placed at the origin of the pair of frequency axes on which the spectrum of the two dimensional W is represented. About this rotation point, the spectrum of $W_{1D,LPF}$ can be rotated 360 degrees.

Figure 7D:
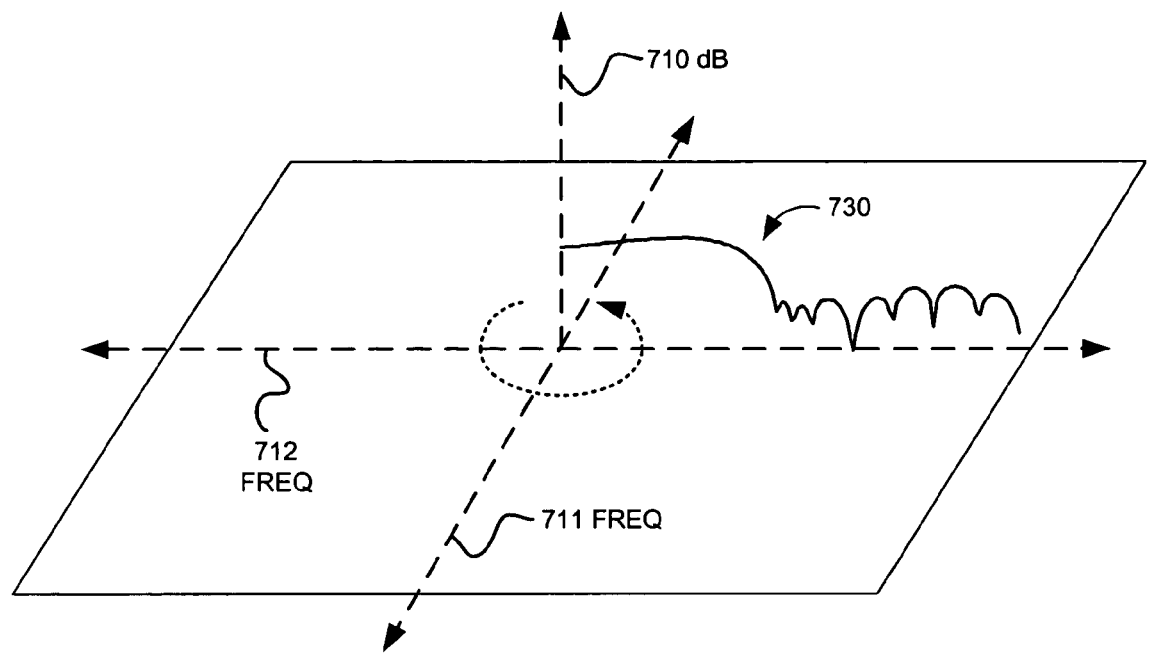
FIGS. 7D and 7E depict the rotation of such one dimensional filter.

For the example of FIG. 7C, rotation of $W_{1D,LPF}$ can be described as follows (and is depicted in FIG. 7D). Assume the result of the rotation is comprised of three axes: a pair of frequency axes intersecting to form a two dimensional plane (axes 711 and 712 of FIG. 7D) and a third dB axis (axis 710 of FIG. 7D) that orthogonally intersects the origin of the frequency plane. The dB axis of FIG. 7C is positioned coextensively with dB axis 710 (i.e., the function of FIG. 7C is positioned to be part of the representation for the result of the rotation) and the function of FIG. 7C (denoted in FIG. 7D as graph 730) is then rotated 360 degrees.

In particular, the two dimensional spectrum of W, as a result of such rotation, is sampled with a Cartesian grid. In the following description of such sampling, while the net result is to sample a two dimensional W, the particular process presented actually samples the one dimensional $W_{1D,LPF}$.

First, the radial frequency distance, $f_r$, at each point in this Cartesian grid is determined by $$f_r = \sqrt{f_x^2 + f_y^2}$$

where $f_x$ is the spatial frequency in one direction and $f_y$ is the spatial frequency in the orthogonal direction. The set of radial frequency distances at all points in this Cartesian grid can be referred to as $f_{r,2D}$. Then the spectrum of $W_{1D,LPF}$, which can now be regarded as a function of radial frequency distance, can be interpolated to obtain values of W at $f_{r,2D}$. Interpolation can be necessary since the spectrum of $W_{1D,LPF}$ is a discrete function and will likely not be represented at all values in $f_{r,2D}$.

Figure 7E:
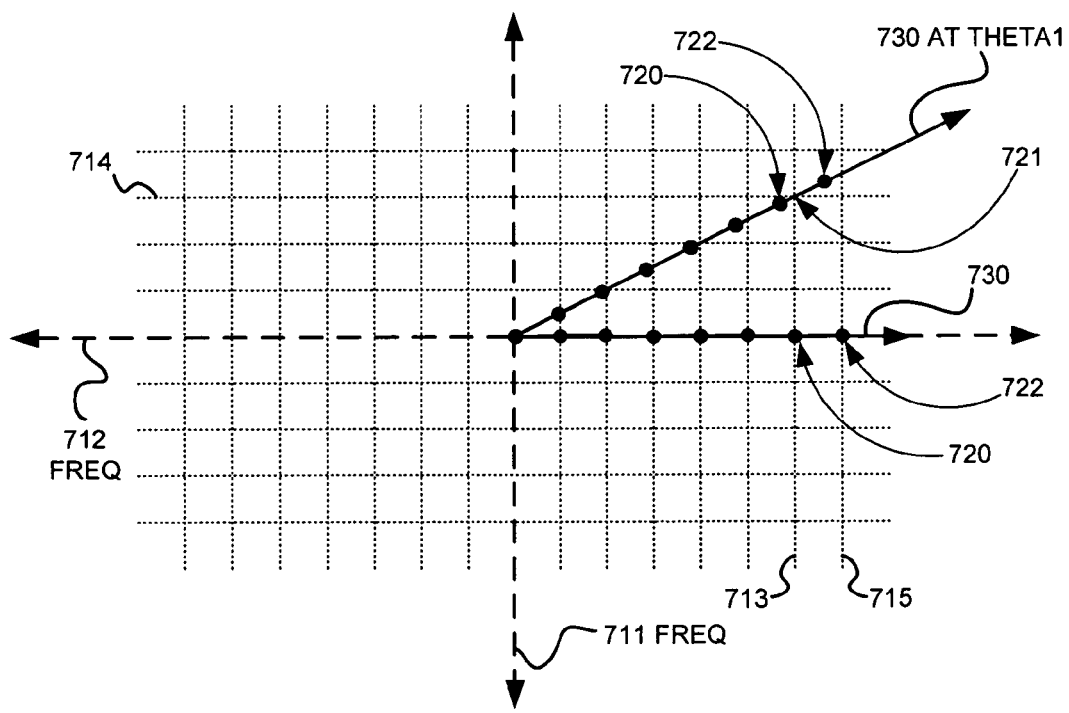

An example of sampling by a Cartesian grid is shown in FIG. 7E. FIG. 7E presents a "top view" of the three-dimensional space of FIG. 7D. Graph 730 (i.e., the function of FIG. 7C) is shown at two positions: coextensive with axis 712 and at an angle called "theta1." Assume graph 730 is comprised of the discrete values represented by its intersection with the vertical axes of FIG. 7E (e.g., axes 711, 713 and 715) when graph 730 is coextensive with horizontal axis 712. Two such values of graph 730, values 720 and 722, are indicated. A point 721 is shown as an example of a point in $f_{r,2D}$ not lying on horizontal axis 712. This point 721 is at the intersection of axes 713 and 714 and, when graph 730 is rotated by theta1, is shown to be between values 720 and 722 of graph 730. Therefore, graph 730 is interpolated to obtain a value at point 721. In general, for each point in $f_{r,2D}$, there is a rotation of $W_{1D,LPF}$ (e.g., the graph 730) that indicates where one-dimensional interpolation can be performed. For points in $f_{r,2D}$ that are outside the frequency range of $W_{1D,LPF}$, their values are set to zero; that is, no interpolation is performed.

Since $f_{r,2D}$ is not uniformly spaced, the general preference, for the interpolation of the spectrum of $W_{1D,LPF}$, is a linear, spatially-variant method. However, since linear, spatially-variant interpolation of a spectrum can cause distortion, the interpolation can be accomplished in two stages: linear, spatially-invariant interpolation to a finer uniform spacing followed by linear, spatially-variant interpolation to a non-uniform spacing. The first stage can be regarded as limiting the distortion of the second stage.

The first stage of uniformly-spaced interpolation can be accomplished by first determining the smallest distance, $\Delta f_r$, between any two values in $f_{r,2D}$. A linear, spatially-invariant method of interpolation can then be performed such that $W_{1D,LPF}$ has values at a set of radial frequencies with a uniform spacing of $\Delta f_r$. As discussed above, an example of linear, spatially-invariant interpolation is Fourier interpolation. In this case, such Fourier interpolation can comprise: Fourier transforming, appending zeros to the edges and then inverse-Fourier transforming.

The second stage of interpolation can be accomplished by using linear, spatially-variant interpolation, as applied to selected samples resulting from the first stage, to determine a value for W at each of the radial frequency values in $f_{r,2D}$.

2.5 Image Deblurring

The part of the overall process of FIG. 1 referred to as "image deblurring" comprises application of W, in order to deblur a mask inspection image, by finding the convolution of W with an inspection image. Deblurring filter W can be applied within a mask-recovery process as follows.

In general, mask-recovery step 111 seeks to obtain the "mask field" for each location of a mask's inspection image. For each mask inspection image location, the mask field is a complex value whose amplitude is the square root of the fraction of light energy transmitted through the mask at that location, and whose phase is determined by the depth of the mask at that location.

Mask recovery can include the following steps: (i) resealing of the inspection image values to units of percentage of intensity transmitted, (ii) interpolation of the inspection image to match the resolution of W and (iii) mapping the rescaled and interpolated inspection image values from intensity to field (herein referred to as "mapping"). The basic operations in mapping are setting the field amplitude equal to the square root of the intensity and assigning the field phase.

The interpolation step of mask recovery can be a linear, spatially-invariant method, using the same interpolation factor, q, used for interpolation of training images.

Deblurring step 112 comprises finding the convolution of W with the inspection image obtained from the inspection system by step 110.

The particular point in the mask recovery process, however, at which the deblurring step 112 is applied, can depend upon the type of inspection system.

For a coherent inspection system, the field is to be deblurred. Therefore, mask recovery is preformed through the mapping step, to obtain the field from the interpolated inspection image, before the filter, W, is applied. An example mask recovery process for a coherent inspection system is depicted in FIG. 11A. As can be seen, mask recovery steps 1150 (rescaling), 1151 (interpolation) and 1152 (mapping) are performed prior to deblurring step 112. For an incoherent inspection system, the intensity is to be deblurred. Therefore, the filter, W, is applied to the interpolated inspection image, before such interpolated inspection image is mapped. An example mask recovery process for an incoherent inspection system is depicted in FIG. 11B. As can be seen, mask recovery steps 1150 (resealing) and 1151 (interpolation) are performed prior to deblurring step 112, but step 1152 (mapping) is performed after deblurring.

Figure 11C:
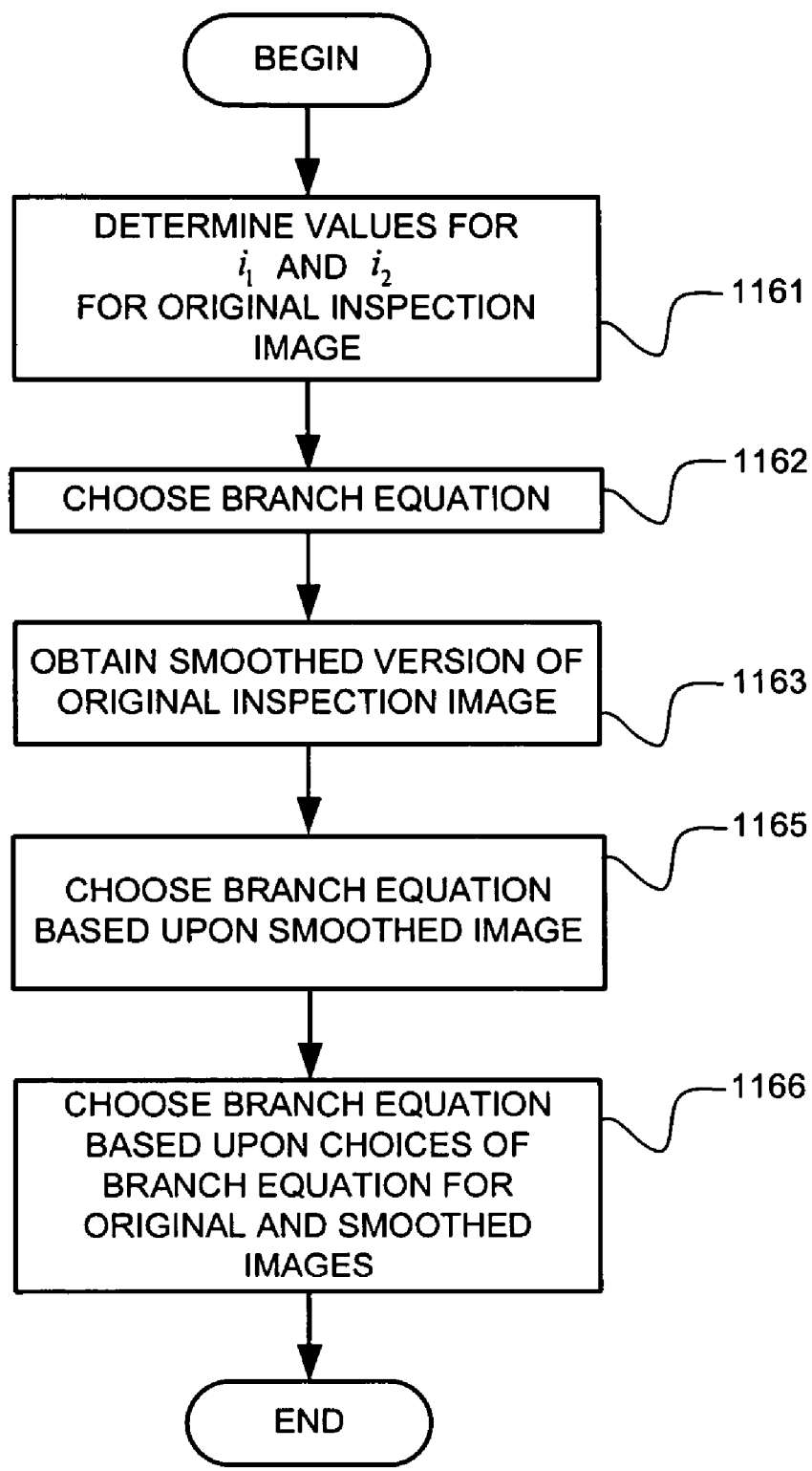

An example mapping of image intensity values to field is as follows (and is depicted in FIG. 11C), where the inspection image to be mapped is obtained from a "halftone" or "attenuated" mask that has only two regions: a "clear" region with 100% transmittance and 0-degree phase, and a "dark" region with transmittance between 5% and 10% and 180-degree phase.

In the following process, i and f are defined to be, respectively, the intensity and field of a mask inspection image at a particular pixel location. Also, for the following mapping process, the following equations are utilized:

$transqrt(i) = ampl(1 + i - i_{dark}) - 1 + f_{dark}$ $ampl(x) = sgn(x)sqrt(abs(x))$ $sgn(x) = 1$ for $x > 0$, and $= -1$ otherwise $sqrt(x) = \sqrt{x}$ for $x \geq 0$, and undefined othewise $abs(x) = x$ for $x \geq 0$, and $-x$ otherwise $i_{dark}$ = transmittance of dark region $f_{dark} = sqrt(i_{dark})$ $i_1 = f_{dark} + 0.15(1 - f_{dark})$ $i_2 = f_{dark} + 0.20(1 - f_{dark})$ $f_1 = transqrt(i_1)$ $f_2 = ampl(i_2)$ In addition, in the following process, the following three equations are referred to as positive, transition and negative branches:

Positive branch: $f = ampl(i)$

Transition branch: $f = \left(\frac{f_2 - f_1}{i_2 - i_1}\right)(ampl(i) - i_1) + f_1$ Negative branch: $f = transqrt(i)$ One of the three branches is applied to the inspection image, on a pixel-by-pixel basis, to produce a corresponding field value. The positive branch simply applies a square-root operation. The transition branch is an affine mapping between the square root of the intensity and the field. The transition branch can avoid field discontinuities that might occur if there were only the positive and negative branches. The negative branch applies that portion of the square-root function, that is centered about the point (i, f)=(1.0, 1.0), to points from a region that is centered about the point (i, f)=($i_{dark}$, sqrt($i_{dark}$)). The negative-branch function can be more appropriate than a simple square-root operation when ringing from interpolation or deblurring dominates the inspection-image intensity.

The selection of a branch equation, for each pixel of an inspection image, can begin by the determination of values $i_1$ and $i_2$ for each inspection image (step 1161).

The branch equation to use, for conversion of a pixel of the inspection image to a corresponding field value, can be selected according to the following thresholds (step 1162):

$i_2 \leq i$: positive branch chosen $i_1 < i < i_2$: transition branch chosen $i \leq i_1$: negative branch chosen However, if branches are chosen just on the basis of applying intensity thresholds to the inspection image, there might be unwanted transitions, between the branch equations chosen for adjacent pixels of the inspection image, caused by ringing from interpolation or deblurring.

Therefore, a smoothed version of the inspection image is determined (step 1163). This can be accomplished by low pass filtering the original inspection image. The cutoff frequency, $f_{smooth}$, of the low pass filter used for smoothing can be set to a value determined by the following equation:

$$f_{smooth} = \frac{0.6}{2d_0}$$

where $d_0$ is the inspection-image pixel size before interpolation. The low pass filter can be, for example, a linear-phase finite impulse response filter with 33 taps, designed using least-squares error minimization.

The smoothed inspection image is then processed in a similar manner to the original inspection image: using values $i_1$ and $i_2$ determined for the original inspection image, a branch, herein referred to as a "smoothed branch," is selected (step 1165) for each pixel of the smoothed image according to the same thresholds given above for selection of branches based upon the original inspection image.

In step 1166, the following Boolean-logic functions are used to select an actual branch equation for conversion of each intensity pixel of the original inspection image to a corresponding field value (where "original branch" refers to the branch equation selected in step 1162):
  If (smoothed branch=positive) AND (original branch=positive), then positive branch is chosen
  If (smoothed branch=negative) OR (original branch=negative), then negative branch is chosen
  If neither of the above two rules applies, then transition branch is chosen The above-described mapping procedure is also applicable to a "binary" mask that has only two regions: a "clear" region with 100% transmittance and 0-degree phase, and a "dark" region with 0% transmittance 0-degree phase.

2.6 Modified Approach: Separable Filter Training

Depending upon the characteristics of the inspection system, separable filter training can be preferable. For example, the inspection-system response may be dominated by the response of the image sensors, and the response of these image-sensors may be separable. A two-dimensional filter, W, can be described as "separable" if it can be written as the following product:

$$W(x,y) = W_x(x) W_y(y)$$

where $W_x$ is a function of "x" only and $W_y$ is a function of "y" only, and where "x" and "y" are orthogonal axes.

Figure 10A:
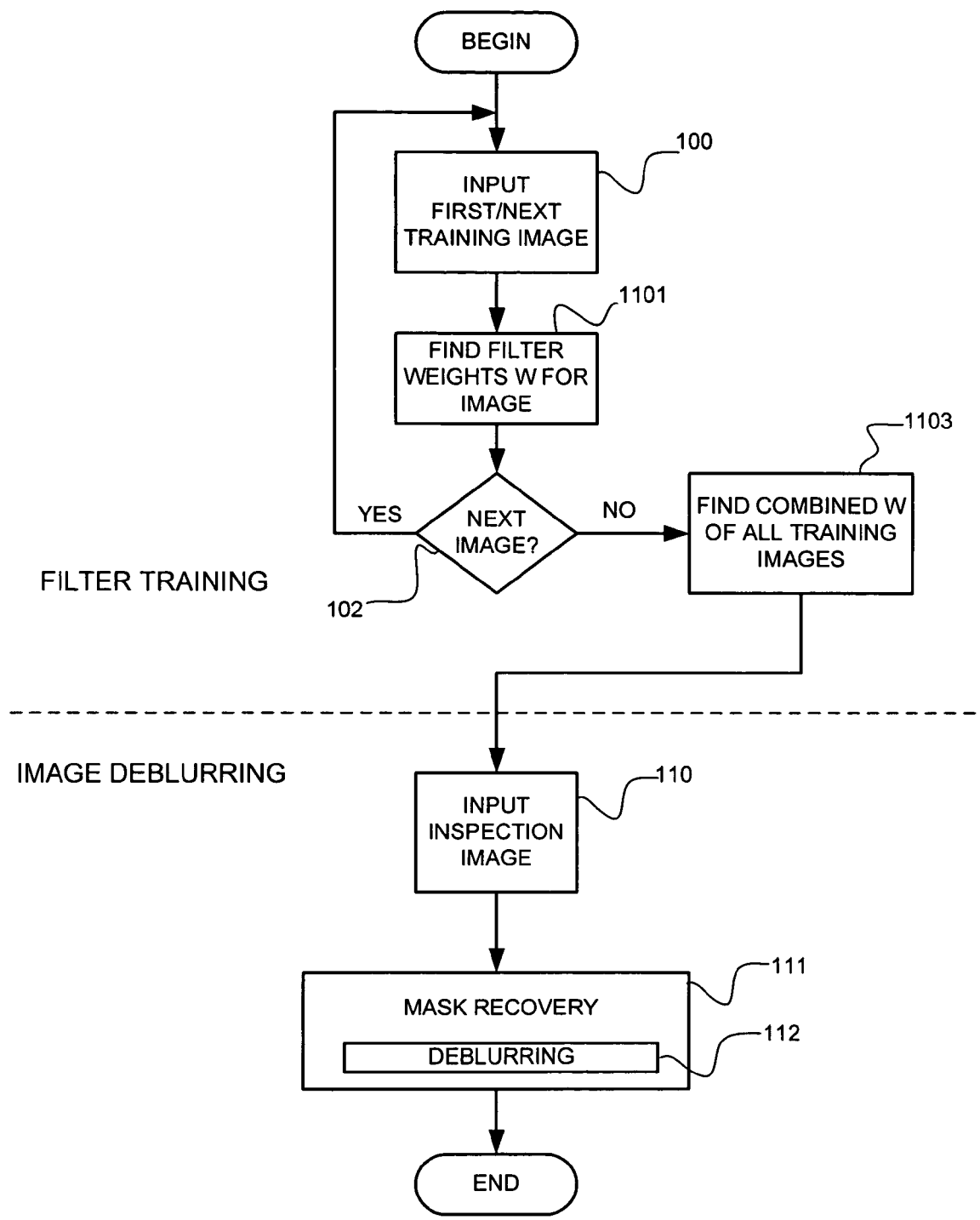
FIGS. 10A and 10C depict the changes to FIG. 1.
Figure 10B:
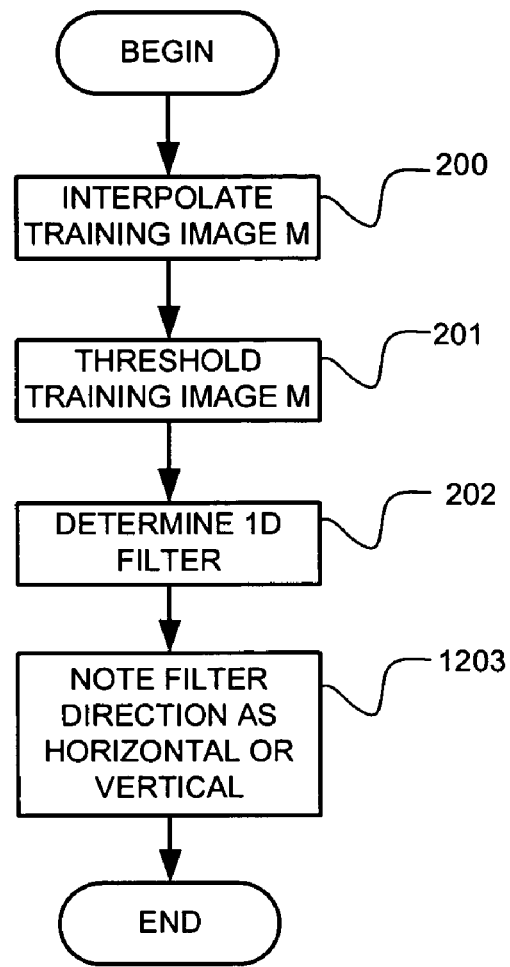
FIG. 10B depicts the changes to FIG. 2, to enable separable filter training.
Figure 10C:
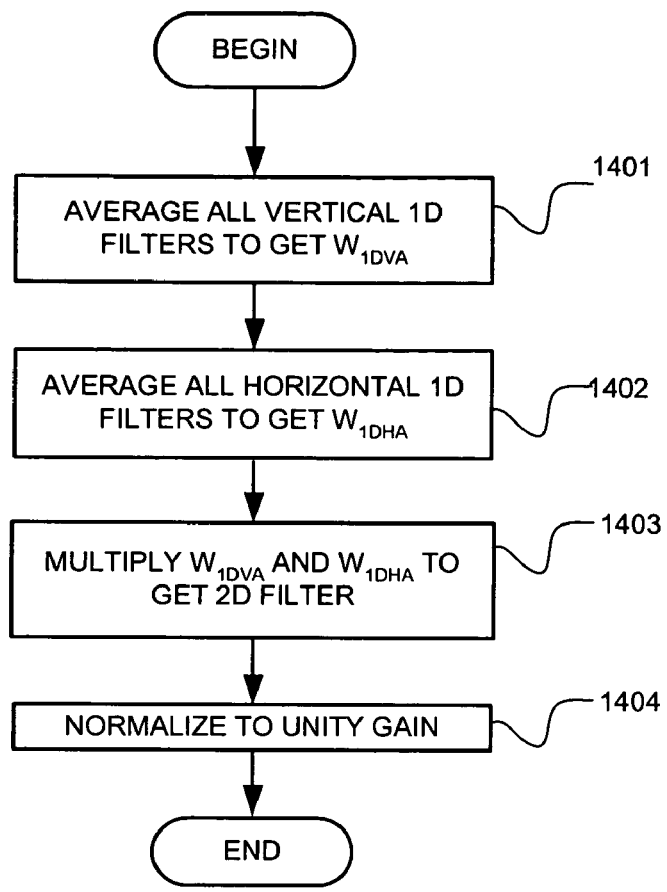

FIGS. 10A, 10B and 10C depict the changes necessary, to above-described filter training, to accomplish separable filter training.

FIG. 10A is the same as FIG. 1, except that 103 has been replaced by step 1103 and 101 has been replaced by step 1101. Step 1103 is depicted in FIG. 10C, while step 1101 is depicted by FIG. 10B.

FIG. 10B is the same as FIG. 2, except that steps 203 and 204 are replaced by step 1203.

Separable filter training can proceed as follows.

According to FIG. 10A, a sequence of training images is processed. Some of these training images vary along a horizontal axis (e.g., are like the example training image of FIG. 8) while other training images vary along a vertical axis.

Each training image is processed according to step 1101 as shown in FIG. 10B. For each such training image, its one dimensional filter $W_{1D}$ is determined (step 202, FIG. 10B).

Next, the one dimensional filter is notated (by step 1203, FIG. 10B) as either horizontal (i.e., $W_{1DH}$) or vertical (i.e., $W_{1DV}$).

Once all the training images are processed, the one dimensional filters, resulting from horizontal and vertical image training, are combined according to step 1103 of FIG. 10C.

Step 1103 operates as follows. All the one dimensional filters resulting from vertical filter training are averaged together to obtain $W_{1DVA}$ (step 1401). All the one dimensional filters resulting from horizontal filter training are averaged together to obtain $W_{1DHA}$ (step 1402). To obtain a two dimensional filter, $W_{1DVA}$ and $W_{1DHA}$ are multiplied together (step 1403) as follows. If the average vertical filter, $W_{1DVA}$, is a column vector and the average horizontal filter, $W_{1DHA}$, is a row vector then the product, $$W = W_{1DVA} W_{1DHA}$$

will give the two dimensional filter, W, as a matrix with the number of columns equal to the number of elements in $W_{1DVA}$ and the number of rows equal to the number of elements in $W_{1DHA}$. The resulting two dimensional filter W can normalized such that it has unity gain (step 1404). As discussed above, with respect to step 204, unity gain means that the sum of the filter weights is one.

2.7 Training Image Recovery

The following mask recovery steps, described above with respect to application of a deblurring filter, can also be applied to the training images: (i) resealing of the inspection image values to units of percentage of intensity transmitted, (ii) interpolation of the inspection image to match the resolution of W and (iii) mapping the rescaled and interpolated inspection image values from intensity to field (herein referred to as "mapping"). The applicability of these mask recovery steps to training images can depend upon the type of inspection system.

Figure 12A:
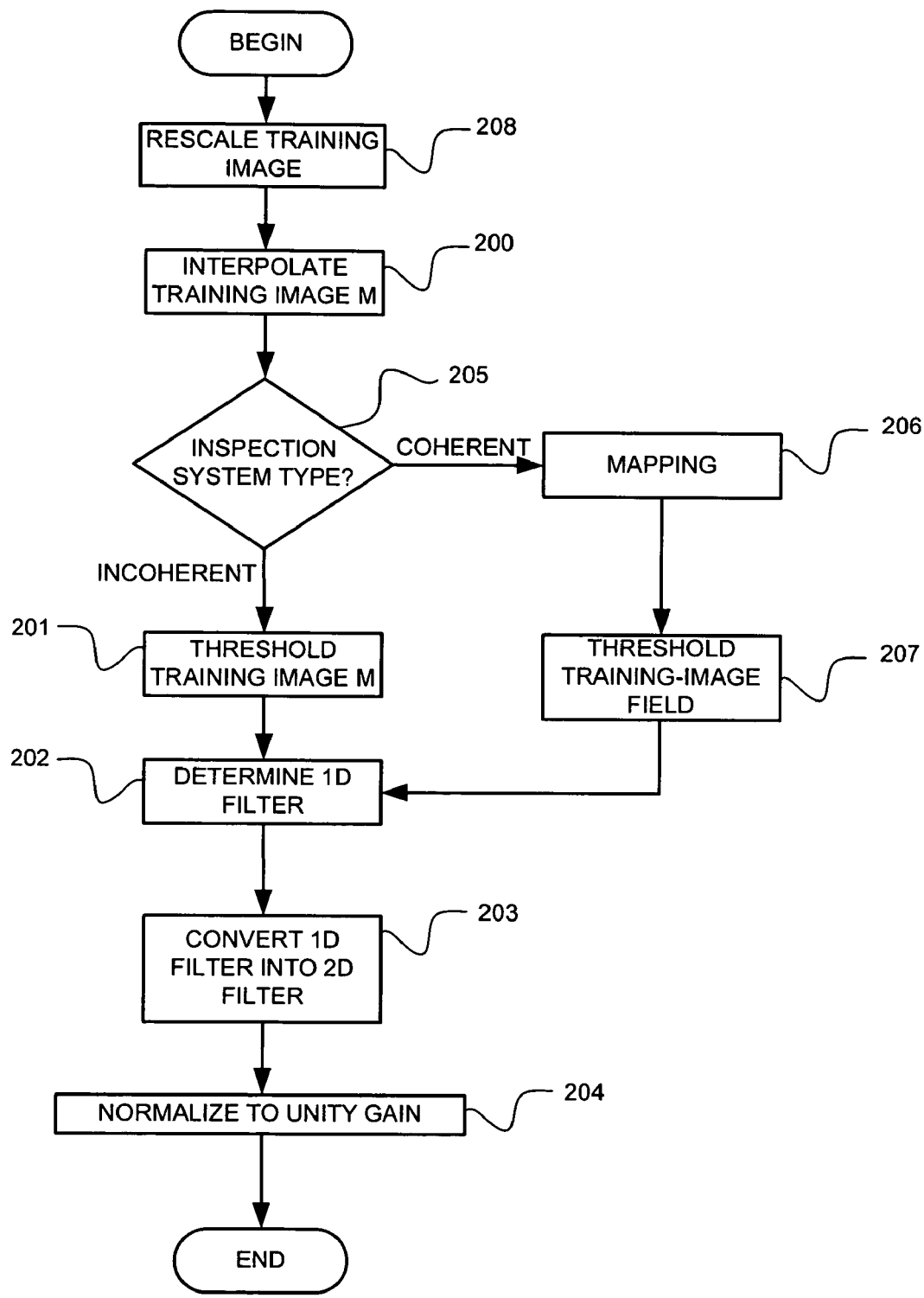
FIGS. 12A and 12B differ from, respectively, FIGS. 2 and 10B by their inclusion of additional mask recovery steps.

FIG. 12A depicts FIG. 2 modified to include mask recovery steps dependent upon whether the inspection system is coherent or incoherent. Similarly, FIG. 12B depicts FIG. 10B modified to include mask recovery steps dependent upon whether the inspection system is coherent or incoherent.

Figure 12B:
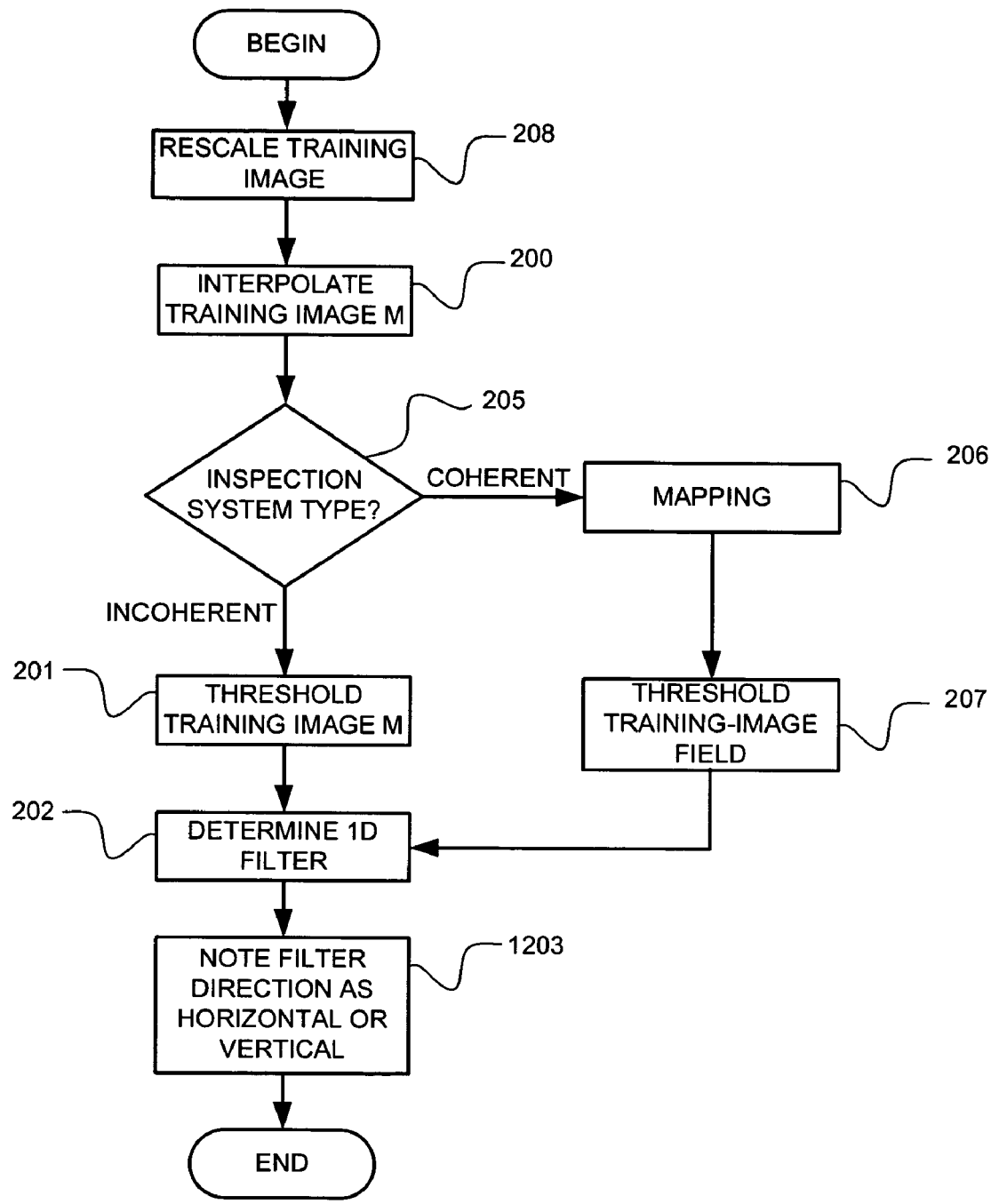

As can be seen, FIGS. 12A and 12B differ from, respectively, FIGS. 2 and 10B by their inclusion of steps 205 to 208. Step 205 tests for the type of inspection system. For a coherent system, mapping step 206 is performed followed by thresholding of a field form of the training image (step 207). For an incoherent system, mapping is not done prior to thresholding of the training image (by step 201). For either coherent or incoherent systems, before interpolating the training image, it can be rescaled by step 208.

3. Hardware Environment

Figure 9:
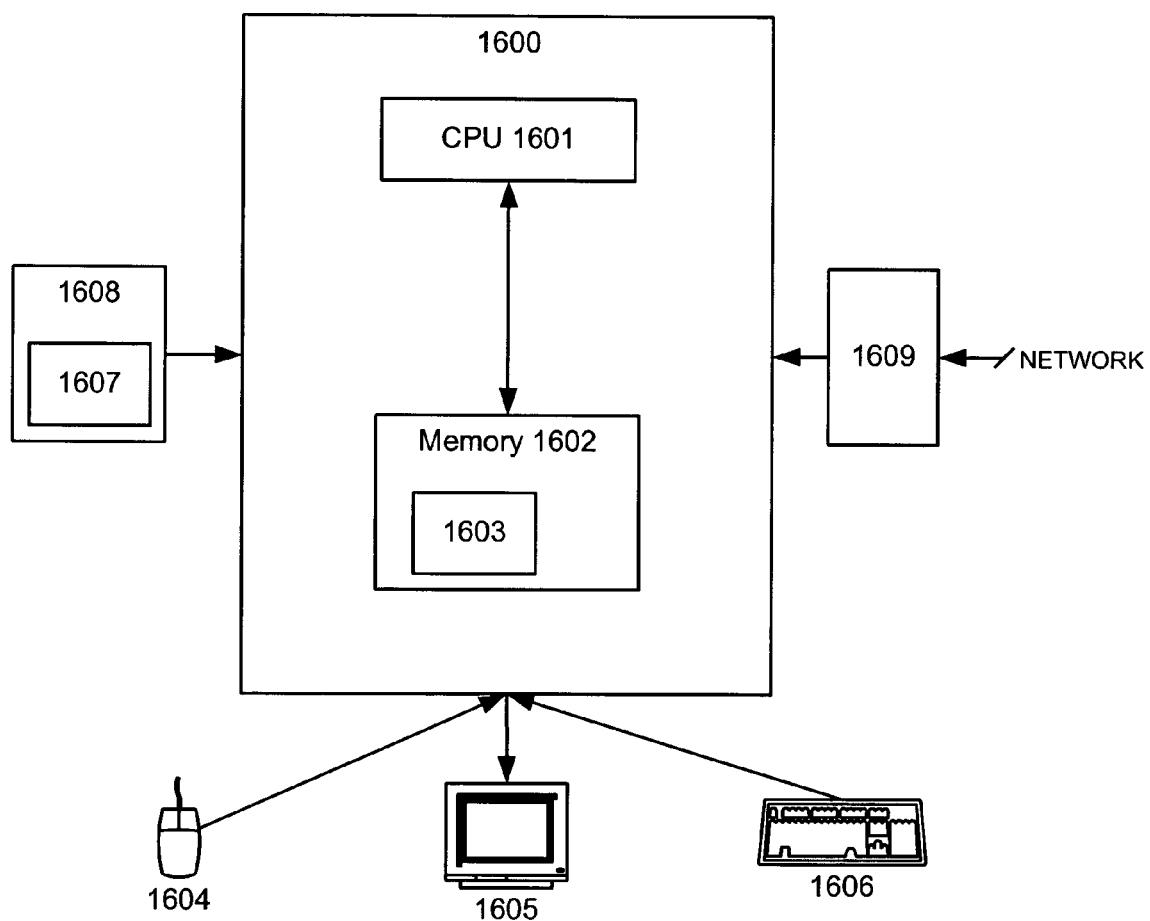
FIG. 9 shows a computing hardware environment within which to operate the present invention.

The mask image deblurring procedures of the present invention can be executed within a computing environment (or data processing system) such as that of FIG. 9. FIG. 9 depicts a workstation computer 1600 comprising a Central Processing Unit (CPU) 1601 (or other appropriate processor or processors) and a memory 1602. Memory 1602 has a portion of its memory 1603 in which are stored the software tools (or computer programs) and data of the present invention. While memory 1603 is depicted as a single region, those of ordinary skill in the art will appreciate that, in fact, such software and data may be distributed over several memory regions or several computers. Furthermore, depending upon the computer's memory organization (such as virtual memory), memory 1602 may comprise several types of memory (including cache, random access memory, hard disk and networked file server). Computer 1600 can be equipped with a display monitor 1605, a mouse pointing device 1604 and a keyboard 1606 to provide interactivity between the software of the present invention and the chip designer. Computer 1600 also includes a way of reading computer readable instructions from a computer readable medium 1607, via a medium reader 1608, into the memory 1602. Computer 1600 also includes a way of reading computer readable instructions via the Internet (or other network) through network interface 1609.

In some embodiments, computer programs embodying the present invention are stored in a computer readable medium, e.g. CD-ROM or DVD.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A computer-readable storage medium storing instructions that when executed by a computer cause the computer to perform a method for determining a filter for a mask image representation of an integrated circuit (IC), the mask image taken by a mask inspection system, the method comprising:
   obtaining a training image from the mask inspection system;
   determining a desired image from the training image;
   determining a one dimensional filter from the training image and desired image;
   low-pass filtering the one dimensional filter; and
   determining a two dimensional filter from the one dimensional filter.

2. A method for determining a filter of a mask image from a mask inspection system, comprising:
   obtaining a training image from the mask inspection system;
   determining a desired image from the training image;
   determining a one dimensional filter from the training image and desired image;
   low-pass filtering the one dimensional filter; and
   determining a two dimensional filter from the one dimensional filter.

3. The method of claim 2, wherein the training image varies along only one dimension.

4. The method of claim 2, wherein the training image is interpolated to a higher resolution grid.

5. The method of claim 2, wherein the desired image is determined by thresholding the training image.

6. The method of claim 2, wherein the step of determining a one dimensional filter comprises optimization according to a metric.

7. The method of claim 2, wherein the step of determining a one dimensional filter comprises normalization of the filter to unity gain.

8. The method of claim 6, wherein the metric is minimization of a sum of squared error between the desired image and the training image.

9. The method of claim 2, wherein determination of the one dimensional filter further comprises the following step:
   determining an auto-correlation matrix.

10. The method of claim 2, wherein determination of the one dimensional filter further comprises the following step:
    determining a cross-correlation vector.

11. The method of claim 2, wherein determination of the one dimensional filter further comprises the following step:
    multiplication of an inverse of an auto-correlation matrix with a cross-correlation vector.

12. The method of claim 2, wherein determination of the one dimensional filter further comprises the following step:
    averaging the one dimensional filter with its reflection.

13. The method of claim 2, wherein determination of the two dimensional filter further comprises the following step:
    rotation of the one dimensional filter.

14. The method of claim 13, wherein rotation of the one dimensional filter further comprises the following step:
    determining at least one radial frequency distance sampled by a grid in which the one dimensional filter is rotated.

15. The method of claim 13, wherein rotation of the one dimensional filter further comprises the following step:
    determining a smallest distance between radial frequency distances sampled by a grid in which the one dimensional filter is rotated.

16. The method of claim 15, farther comprising the following step:
    spatially invariant interpolation of the one dimensional filter according to the smallest distance.

17. The method of claim 16, farther comprising the following step:
    spatially variant interpolation of the one dimensional filter whose distortion is limited by the spatially invariant interpolation.

18. The method of claim 13, wherein rotation of the one dimensional filter further comprises the following step:
    assembling interpolated values of the one dimensional filter into a two dimensional grid.

19. The method of claim 2, wherein the step of obtaining a training image obtains a plurality of training images, the step of determining a filter determines a filter for each training image and the step of determining a filter combines the filters determined.

20. The method of claim 19, wherein the step of combining comprises averaging.

21. The method of claim 19, wherein the plurality of training images comprises a training image varying only along a first dimension and another training image varying only along a second orthogonal dimension.

22. The method of claim 19, wherein the step of combining comprises multiplication.

23. The method of claim 21, wherein a filter determined for a training image varying only along a first dimension is notated as being a filter of a first type and a filter determined for a training image varying only along a second dimension is notated as being a filter of a second type.

24. The method of claim 23, wherein filters of the first type are averaged to find a first average filter and filters of the second type are averaged to find a second average filter.

25. The method of claim 24, where the first and second average filters are multiplied.

* * * * *

UNITED STATES PATENT AND TRADEMARK OFFICE
CERTIFICATE OF CORRECTION

PATENT NO.          : 7,483,559 B2                                     Page 1 of 1
APPLICATION NO.     : 10/917942
DATED               : January 27, 2009
INVENTOR(S)         : Gerard Terrence Luk-Pat et al.

It is certified that error appears in the above-identified patent and that said Letters Patent is hereby corrected as shown below:

In claim 16 (at column 16, line 26), replace the word "farther" with the word --further--.

In claim 17 (at column 16, line 30), replace the word "farther" with the word --further--.

Signed and Sealed this

Seventeenth Day of March, 2009

JOHN DOLL
*Acting Director of the United States Patent and Trademark Office*